US012572390B2

(12) United States Patent
Freese et al.

(10) Patent No.: US 12,572,390 B2
(45) Date of Patent: Mar. 10, 2026

(54) SYSTEMS AND METHODS FOR ADAPTIVE WEIGHTING OF MACHINE LEARNING MODELS

(71) Applicant: Included Health, Inc., San Francisco, CA (US)

(72) Inventors: Nathaniel Freese, San Francisco, CA (US); Jayodita Sanghvi, San Francisco, CA (US); Jyotiwardhan Patil, San Francisco, CA (US); Peyton Rose, San Francisco, CA (US); Eric Carlson, San Francisco, CA (US); Diane Ivy, San Francisco, CA (US)

(73) Assignee: Included Health, Inc., San Francisco, CA (US)

( * ) Notice: Subject to any disclaimer, the term of this patent is extended or adjusted under 35 U.S.C. 154(b) by 815 days.

(21) Appl. No.: 17/119,986

(22) Filed: Dec. 11, 2020

(65) Prior Publication Data

US 2021/0182113 A1      Jun. 17, 2021

Related U.S. Application Data

(60) Provisional application No. 62/948,152, filed on Dec. 13, 2019.

(51) Int. Cl.
| | |
|---|---|
| *G06F 9/50* | (2006.01) |
| *G06F 16/9035* | (2019.01) |
| *G06N 20/00* | (2019.01) |

(52) U.S. Cl.
CPC .......... *G06F 9/5055* (2013.01); *G06F 9/5038* (2013.01); *G06F 16/9035* (2019.01); *G06N 20/00* (2019.01)

(58) Field of Classification Search
CPC .. G06F 9/5055; G06F 9/5038; G06F 16/9035; G06N 20/00; G16H 50/20
See application file for complete search history.

(56) References Cited

U.S. PATENT DOCUMENTS

| | | | | |
|---|---|---|---|---|
| 10,013,416 B1 * | 7/2018 | Bhardwaj | ............... | G06F 40/30 |
| 11,062,394 B2 * | 7/2021 | Sentell | ................... | G16H 10/60 |
| 2010/0191071 A1 * | 7/2010 | Anderson | .............. | G16H 50/50 |
| | | | | 703/11 |
| 2020/0066397 A1 * | 2/2020 | Rai | ...................... | G06Q 10/067 |

* cited by examiner

*Primary Examiner* — Aleksandr Kerzhner
*Assistant Examiner* — Aryan D Toughiry
(74) *Attorney, Agent, or Firm* — FINNEGAN, HENDERSON, FARABOW, GARRETT & DUNNER LLP

(57) ABSTRACT

Methods, systems, and computer-readable media for generating a personalized virtual network. The method acquires a request for a service associated with a user and their preferences. The method then identifies one or more conditions of the user and their propensities based on a first set of machine learning models using stored past information of the user. The method next identifies a second set of machine learning models and evaluates the weightage of each model based on the determined propensities of the conditions. The evaluated weights are applied to the second set of models to generate a personalized virtual network for the user.

20 Claims, 7 Drawing Sheets

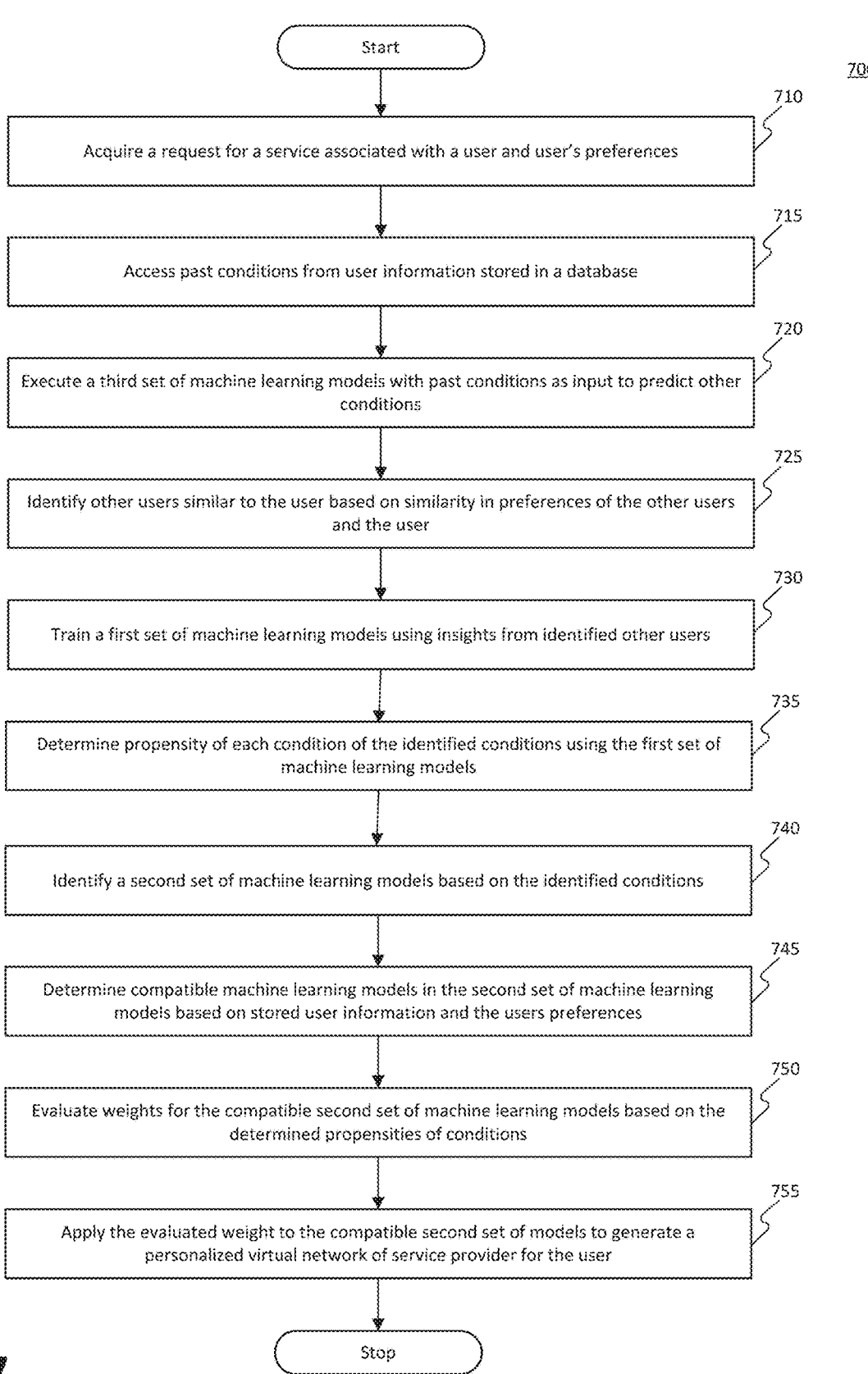

700

Start

Acquire a request for a service associated with a user and user's preferences
710

Access past conditions from user information stored in a database
715

Execute a third set of machine learning models with past conditions as input to predict other conditions
720

Identify other users similar to the user based on similarity in preferences of the other users and the user
725

Train a first set of machine learning models using insights from identified other users
730

Determine propensity of each condition of the identified conditions using the first set of machine learning models
735

Identify a second set of machine learning models based on the identified conditions
740

Determine compatible machine learning models in the second set of machine learning models based on stored user information and the users preferences
745

Evaluate weights for the compatible second set of machine learning models based on the determined propensities of conditions
750

Apply the evaluated weight to the compatible second set of models to generate a personalized virtual network of service provider for the user
755

Stop

Fig. 7

SYSTEMS AND METHODS FOR ADAPTIVE WEIGHTING OF MACHINE LEARNING MODELS

CROSS-REFERENCE TO RELATED APPLICATIONS

This application claims priority to U.S. Provisional Application No. 62/948,152, filed on Dec. 13, 2019, the entirety of which is hereby incorporated by reference.

BACKGROUND

An ever increasing amount of data and data sources are now available to researchers, analysts, organizational entities, and others. This influx of information allows for sophisticated analysis but, at the same time, presents many new challenges for sifting through the available data and data sources to locate the most relevant and useful information. As the use of technology continues to increase, so, too, will the availability of new data sources and information.

Because of the abundant availability of data from a vast number of data sources, determining the optimal values and sources for use presents a complicated problem difficult to overcome. Accurately utilizing the available data can require both a team of individuals possessing extensive domain expertise as well as many months of work to create useful personalized virtual networks of data detailing possible outcomes. The process can involve exhaustively searching existing literature, publications, and other available data to identify and study relevant data sources that are available both privately and publicly.

While this approach can often provide effective academic analysis, applying these types of analytical techniques to domains requiring accurate results obtainable only through time and resource intensive research is incompatible with the demands of modern applications. For example, the developed model may not line up with specific circumstances or individual considerations. In this scenario, applying the model requires extrapolation to fit the specific circumstances, diluting the effectiveness of the model, or requires spending valuable time and resources to modify the model. As a result, models developed in this way typically provide only generalized guidance insufficient for use in personalized settings. As more detailed and individualized data becomes available, demand for the ability to accurately discern relevant data points from the sea of available information, and efficiently apply that data across thousands of personalized scenarios increases.

SUMMARY

Certain embodiments of the present disclosure relate to a non-transitory computer readable medium, including instructions that when executed by one or more processors cause a system to perform a method for generating a personalized virtual network, the method comprising: acquiring a request for a service, wherein the request is associated with a user and the user's preferences; identifying one or more conditions of the user based on stored user information and the acquired request; determining a propensity for each condition of the identified one or more conditions using a first set of one or more machine learning models with the stored user information as input; identifying a second set of one or more machine learning models based on the identified one or more conditions; evaluating weights for the second set of one or more machine learning models based on the determined propensities of one or more conditions; and applying the evaluated weights to the second set of models to generate a personalized virtual network for the user.

Certain embodiments of the present disclosure relate to a method performed by a system for generating a personalized virtual network, the method comprising: acquiring a request for a service, wherein the request is associated with a user and the user's preferences; identifying one or more conditions of the user based on stored user information and the acquired request; determining a propensity for each condition of the identified one or more conditions using a first set of one or more machine learning models with the stored user information as input; identifying a second set of one or more machine learning models based on the identified one or more conditions; evaluating weights for the second set of one or more machine learning models based on the determined propensities of one or more conditions; and applying the evaluated weights to the second set of models to generate a personalized virtual network for the user.

Certain embodiments of the present disclosure relate to a system for generating a personalized virtual network. The system includes one or more processors executing processor-executable instructions stored in one or more memory devices to perform a method, the method comprising: acquiring a request for a service, wherein the request is associated with a user and the user's preferences; identifying one or more conditions of the user based on stored user information and the acquired request; determining a propensity for each condition of the identified one or more conditions using a first set of one or more machine learning models with the stored user information as input; identifying a second set of one or more machine learning models based on the identified one or more conditions; evaluating weights for the second set of one or more machine learning models based on the determined propensities of one or more conditions; and applying the evaluated weights to the second set of models to generate a personalized virtual network for the user.

BRIEF DESCRIPTION OF THE DRAWINGS

The accompanying drawings, which are incorporated in and constitute a part of this specification, illustrate several embodiments and, together with the description, serve to explain the disclosed principles. In the drawings:

FIG. 7 is a flowchart showing an exemplary method for generating a personalized virtual network, according to some embodiments of the present disclosure.

DETAILED DESCRIPTION

In the following detailed description, numerous specific details are set forth in order to provide a thorough understanding of the disclosed example embodiments. However, it will be understood by those skilled in the art that the principles of the example embodiments may be practiced without every specific detail. Well-known methods, procedures, and components have not been described in detail so as not to obscure the principles of the example embodiments. Unless explicitly stated, the example methods and processes described herein are neither constrained to a particular order or sequence nor constrained to a particular system configuration. Additionally, some of the described embodiments or elements thereof can occur or be performed simultaneously, at the same point in time, or concurrently. Reference will now be made in detail to the disclosed embodiments, examples of which are illustrated in the accompanying drawings. Unless explicitly stated, sending and receiving as used herein are understood to have broad meanings, including sending or receiving in response to a specific request or without such a specific request. These terms thus cover both active forms, and passive forms, of sending and receiving.

The embodiments described herein provide technologies and techniques for evaluating large numbers of data sources and vast amounts of data used in the creation of a predictive or analytical data model. These technologies can use information relevant to the specific domain and application of a data model to prioritize potential data sources. Further, the technologies and techniques herein can interpret the available data sources and data to extract probabilities and outcomes associated with the specific domain and application of the data model. The described technologies can synthesize the data into a coherent data model, that can be used to analyze and compare various paths or courses of action.

These technologies can efficiently evaluate data sources and data, prioritize their importance based on domain and circumstance specific needs, and provide effective and accurate predictions that can be used to evaluate potential courses of action. The technologies and methods allow for the application of data models to personalized circumstances. These methods and technologies allow for detailed evaluation that can improve decision making on a case by case basis.

Figure 1:
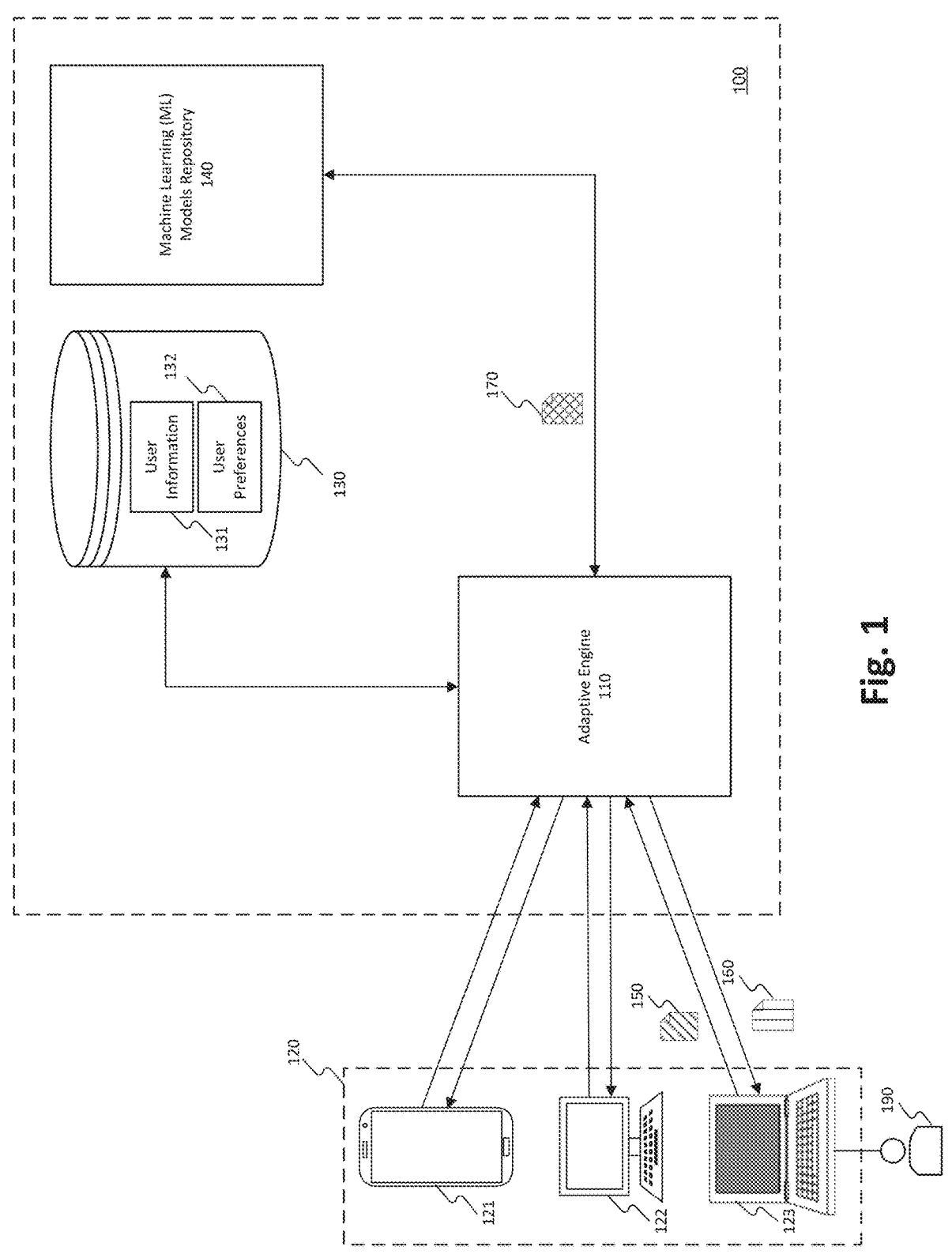
FIG. 1 is a block diagram showing various exemplary components of an adaptive weighting system for generating a personalized virtual network, according to some embodiments of the present disclosure.

FIG. 1 is a block diagram showing various exemplary components of an adaptive weighting system 100 for generating a personalized virtual network, according to some embodiments of the present disclosure. Adaptive weighting system 100 comprises an adaptive engine 110 that may receive queries from users of devices 120, a database 130, and a machine learning models repository 140.

As illustrated in FIG. 1, devices 120 may comprise devices 121 (mobile device), 122 (desktop computer), and 123 (laptop). Users may communicate with the adaptive weighting system 100 using devices 120. For example, a user 190 of device 123 may send a query 150 to the adaptive weighting system 100. The query 150 received by the adaptive weighting system 100 may result in adaptive engine 110 generating a personalized virtual network 160.

After receiving the query 150, the adaptive weighting system 100 may direct adaptive engine 110 to convert the query 150 to a service request 170 in order to generate the personalized virtual network 160. In some embodiments, the query 150 sent by devices 120 may include a service request. Adaptive engine 110 may add additional service requests to a service request already present in query 150.

The adaptive weighting system 100 may also include a database 130 to help determine an appropriate service request (e.g., the service request 170). Database 130 may include additional information helpful in the generation of the service request 170. The additional information may help determine the context of query 150 and generate the appropriate service request 170. The additional information may include historical information on the usage of the adaptive weighting system 100 or service providers by user 190. As shown in FIG. 1, additional information can include user information 131 and user preferences 132. The user preferences 132 may be the information supplied by users themselves, and the user information 131 may include information about a user determined from past usage of the adaptive weighting system 100.

The adaptive engine 110 may append additional information about the user from database 130 to the service request 170 supplied to a Machine Learning (ML) models repository 140 in order to generate a personalized virtual network 160. The additional information may aid in filtering results generated upon executing ML models in ML models repository 140 for the service request 170.

Adaptive engine 110, upon receiving the query 150, may determine the user of the query from the database 130 to identify the relevant user details from database records containing user information 131 and user preferences 132. The past usage of adaptive weighting system 100 present in user information 131 may be generated from the user interaction with previously generated virtual networks. The user information 131 may also include information about the previous queries sent to the adaptive weighting system 100.

The user preferences 132 may be supplied as part of query 150. The user preferences 132 may be updated at regular intervals. The update to the user preferences 132 may be supplied directly by a user (e.g., the user 190) through a query (e.g., the query 150). In some embodiments, the user preferences 132 may be determined automatically based on the usage of the adaptive weighting system 100 by a user (e.g., the user 190). For example, the user preferences 132 may be updated based on the interactions with personalized virtual networks generated for past queries to the adaptive weighting system 100. In some embodiments, only a subset of user preferences 132 may be overridden with new values. The user preferences 132 may have a default set of values, and they may vary by user.

The adaptive weighting system 100 may include Machine Learning (ML) models repository 140 to make a predictive analysis of the generated service request 170. The adaptive engine 110 may send a service request 170 prepared by adaptive engine 110 with the help of user information 131 and user preferences 132 to ML models repository 140 to generate a personalized virtual network (e.g., the personalized virtual network 160). The service request 170 may be used by ML models repository 140 to determine ML models relevant to respond to the query 150 sent by the user 190. The ML models repository 140 may include models for different factors in determining the personalized virtual network 160 and may be determined using the service request 170. In some embodiments, the adaptive engine 110 may use a set of ML models in the ML models repository 140 to prepare the service request 170.

The ML models repository 140 may store the ML models in a flat file system. The ML models repository may be a cloud-based file system (e.g., Amazon S3). The ML models repository 140 may maintain different versions of the ML models trained using different sets of data. The selection of relevant model from different versions of an ML model may be determined based on the user information 131 and user preferences 132.

The adaptive engine 110 generates the personalized virtual network 160 specifically for the user 190 by applying specific weights to the determined relevant ML models of the ML models repository 140. The ML models' weightage determination may represent the true requirements of a user (e.g., the user 190) based on a query (e.g., the query 150) and other additional information about the user identified from the user information 131. The determination of specific weights to be applied to the selected ML models to generate a personalized virtual network is discussed in detail in FIG. 4. Adaptive weighting system 100 may interact with other systems to transform the service providers to a personalized virtual network (e.g., the personalized virtual network 160) prior to presenting the results to the user making the query request.

The personalized virtual network 160 may include a list of service providers who can help resolve the query 150. The service request 170 generated by the adaptive engine 110 may be used in identifying the service providers included in the personalized virtual network 160. In particular, the adaptive engine 110 may use database 130 to generate the personalized virtual network 160 of service providers matching the service request 170. In some embodiments, the personalized virtual network 160 may include links to a location containing lists of service providers. For example, the adaptive weighting system 100 may behave as a meta-search engine offering results from several search engine systems, with each having their own subset of search results, including service providers.

The identified additional information about a user from the database 130 may help update the service request 170 to include additional services or specify further filters on a service identified as part of the service request 170. For example, in one scenario, a patient looking for certain health care providers may have preferences set in the user preferences 132 for service providers available over the weekend and having certain language skills. In another scenario, adaptive weighting system 100 may update the service request 170 based on a query (e.g., the query 150) for a podiatrist to include an additional request for a physiotherapist as an alternative service based on past health care information stored in the user information 131 indicating recent knee surgery.

The query (e.g., query 150) made by a user (e.g., the user 190) may only mention a general query and not mention a specific service. For example, the user 190 may send a query for a foot pain symptom resulting in service requests for both podiatrists and physiotherapists generated by the adaptive weighting system 100. Based on the health record information present in the database 130, the adaptive weighting system 100 may generate a service request for a physiotherapist as the user (e.g., user 190) has recently undergone a knee replacement surgery. In some embodiments, the adaptive weighting system 100 may generate a service request to override the user service request. If the user rejects the results of the overridden service requests, the adaptive weighting system 100 may then generate the results for the original service request. Such interactions by a user with the service request results may help adaptive engine 110 of adaptive weighting system 100 in generating future service requests.

The ML models repository 140 may include models for different factors in determining a personalized virtual network. For example, in healthcare practice, the ML models may include a model of health care providers based on travel distance, and another model to help match the specializations of a health care providers to the symptoms shared by a patient in a query. The ML models repository 140 may include models to help determine the weight to be given to these different models when identifying service providers.

Adaptive weighting system 100 can be related to many different domains or fields of use. Descriptions of embodiments related to specific domains, such as healthcare, is not intended to limit the disclosed embodiments to those specific domains, and embodiments consistent with the present disclosure can apply to any domain that utilizes predictive modeling based on available user information.

Figure 2:
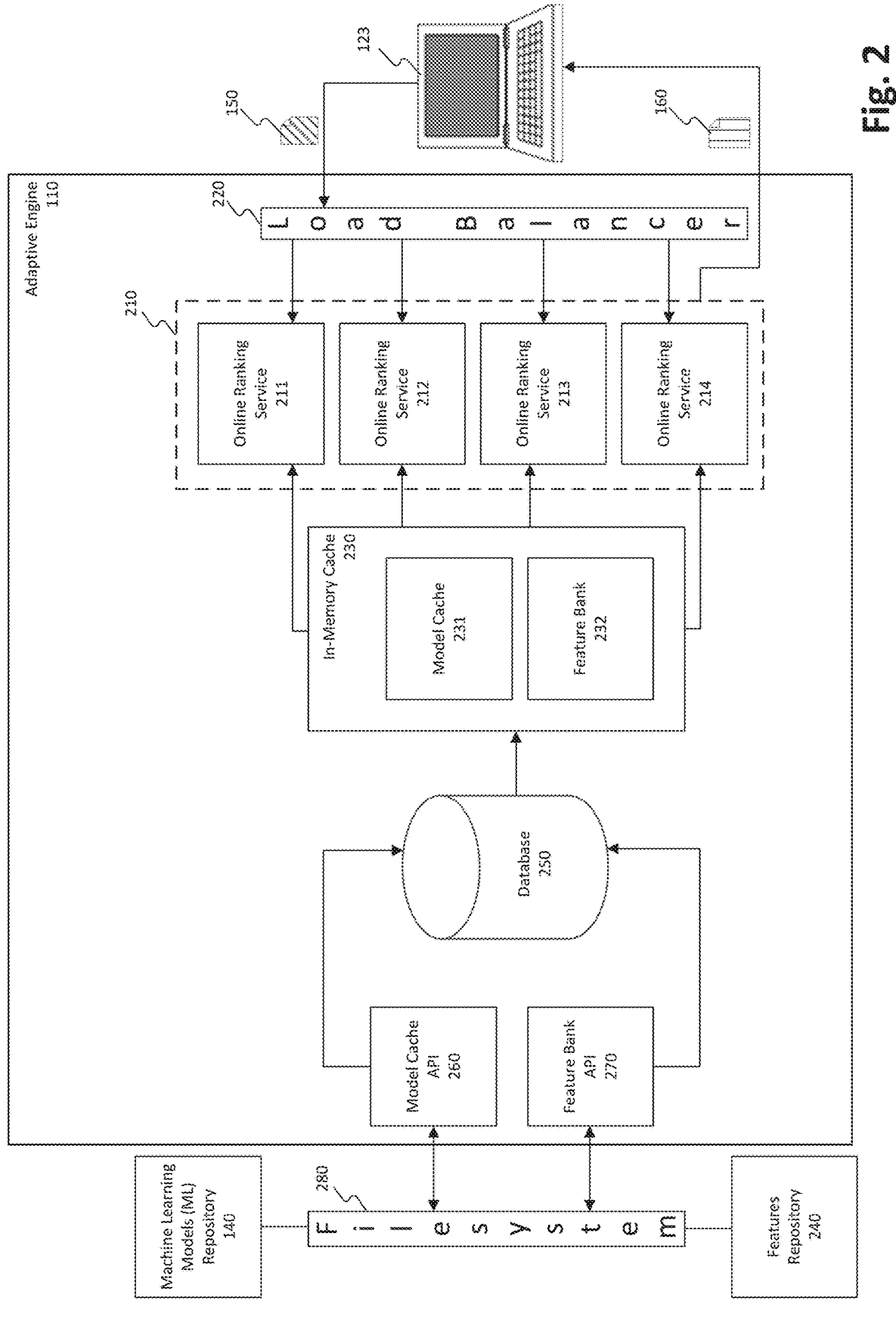
FIG. 2 is a block diagram of an exemplary adaptive engine of an adaptive weighting system of FIG. 1, according to some embodiments of the present disclosure.

FIG. 2 is a block diagram of an exemplary adaptive engine 110 of an adaptive weighting system 100 of FIG. 1, according to some embodiments of the present disclosure. As shown in FIG. 2, the internals of an exemplary adaptive engine 110, which includes an online ranking service 210 may help in preparing a personalized virtual network (e.g., the personalized virtual network 160) in response to a query (e.g., the query 150). Preparation of the personalized virtual network 160 may include ordered listing and grouping of service providers.

As shown in FIG. 2, the adaptive engine 110 may comprise the online ranking service 210 to help determine the ranked order of the service providers determined to be part of a personalized virtual network (e.g., the personalized virtual network 160) of service providers shared with a user (e.g., the user 190). The online ranking service 210 may be replicated multiple times across multiple computers of a cloud computing service (not shown in the figure). The multiple instances 211-214 of online ranking service 210 may help with handling multiple users' queries simultaneously. The adaptive weighting system 100 (not shown in the figure) may receive the query 150 and may delegate the online ranking service 210 to help determine the personalized virtual network 160.

The adaptive engine 110 may also include a load balancer 220 to manage load of users' queries sent to the online ranking service 210. Load balancer 220 may manage the users' query load by algorithmically selecting an online ranking service instance of online ranking service instances 211-214. For example, the load balancer 220 may receive the query 150 from the device 123 and forward it to the online ranking service instance 211. In some embodiments, the load balancer 220 may go through a round-robin process to forward the user queries to online ranking service instances 211-214. In some embodiments, the online ranking service instances 211-214 may each handle different types of user queries. The type of query may be determined by the load balancer 220.

The ranking method followed by online ranking service 210 may depend on the determined type of the query 150. In some embodiments, the ranked results generated by a set of online ranking service instances may be combined together by another set of online ranking service instances. For example, an online ranking service instance may rank based on the quality of healthcare provided, and another instance may rank based on the efficiency of the health care provider, and a third online ranking service may create composite ranks based on the ranking of service providers based on quality and efficiency.

The online ranking service 210 may utilize ML models to rank service providers. The online ranking service 210 may obtain the service providers through a set of ML models in ML models repository 140 and then rank them using another set of ML models in the ML models repository 140. The ML models used for processing the identified service providers may reside in an in-memory cache 230 for quick access. The ML models in the in-memory cache 230 may be pre-selected or identified based on a query (e.g., the query 150) sent by a user (e.g., the user 190). The adaptive engine 110 may include a model cache 231 to manage the ML models in the in-memory cache 230. In some embodiments, the model cache 231 may manage the models by maintaining a lookup table for different types of ML models. The model cache 231 may maintain and generate statistics about the ML models in in-memory cache 230. In some embodiments, the model cache 231 may only manage copies of models upon a user request. The model cache 231 may only include a single copy of each model in the in-memory cache 230. In some embodiments, the model cache 231 may also include multiple instances of the same ML models trained with different sets of data present in the database 130.

The online ranking service 210 may also utilize features used to identify the occurrence of certain events in user information 131 to help generate a personalized virtual network. The occurrences of certain events may describe the state of the user and may help in predicting potential future events occurrence. The adaptive engine 110 may also store features used in predicting future events in feature bank 232. The online ranking service 210 may use the features in the feature bank 232 as input to ML models in model cache 231 to predict best suited service providers to be included in the personalized virtual network 160. The features in the feature bank 232 may also help in selecting ML models in model cache 231 for determining the order of the service providers. The list of service providers being ordered may be determined by adaptive engine 110 (not shown in the figure). Online ranking service 210 may request adaptive engine 110 to identify the service providers prior to ordering the filtered set of service providers.

ML models in the in-memory cache 230 may be regularly copied from a key-value pair database 250 containing the trained ML models of ML models repository 140. Database 250 may access ML models in the ML models repository 140 using a model cache API 260. In some embodiments, the ML models repository 140 may be part of a file system 280. Database 250 may access ML models in ML models repository 140 to train the model at regular intervals. In some embodiments, database 250 may access the ML models repository 140 to identify new features of a user based on the observed features currently residing in features repository 240. Database 250 may access the observed featured in the features repository 240 using feature bank API 270. Database 250 supplies the trained ML models and features determined using ML models to the in-memory cache 230 to be managed by model cache 231 and feature bank 232, respectively. The accessed features and ML models residing in database 250 and in-memory cache may be utilized by both ranking service 210 and other services that are part of the adaptive weighting system 100.

Figure 3:
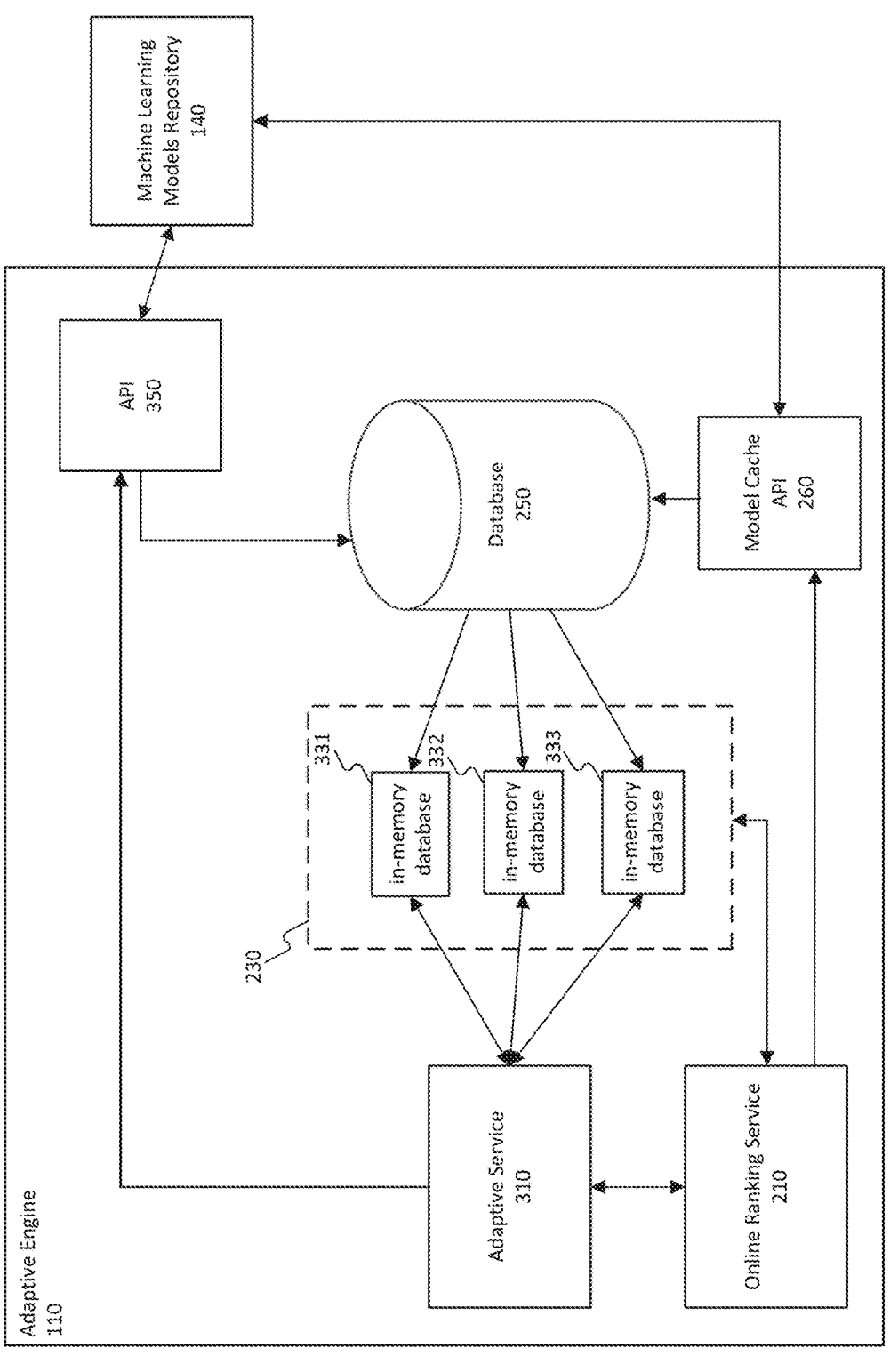
FIG. 3 is a block diagram of an exemplary adaptive engine of an adaptive weighting system of FIG. 1, according to some embodiments of the present disclosure.

FIG. 3 is a block diagram of an exemplary adaptive engine 110 of an adaptive weighting system 100 of FIG. 1, according to some embodiments of the present disclosure. As shown in FIG. 3, different services within the adaptive engine 110 may interact with each other and other components of the adaptive system 100. The adaptive engine 110 may comprise an adaptive service 310 in addition to the online ranking service 210 to aid in the preparation of the personalized virtual network 160 in response to a query 150. The adaptive service 310 may conduct predictive analysis for the service requests using identified ML models. The predictive analysis may include application of weight factors to the identified ML models in preparing the personalized virtual network. The online ranking service 210 and the adaptive service 310 may share components of the adaptive engine when communicating with ML models repository 140.

As shown previously in FIG. 2, adaptive engine 110 may retrieve the ML models in ML models repository 140 and store them in the database 250. The adaptive engine 110 may then select a few to be included in the in-memory cache 230. As shown in FIG. 3, adaptive service 310 in the adaptive engine 110 may access the retrieved ML models through in-memory cache 230, similar to online ranking service 210. In some embodiments, the adaptive service 310 may request online ranking service 210 to help access the ML models in the in-memory cache 230. The adaptive service 310 may access the ML models repository 140 using an API 350. In some embodiments, adaptive service 310 may use model cache API 260 to retrieve ML models in the ML models repository 140. The access to the ML models repository 140 via the API 350 may result in the evaluation of the relevance of the models for the generated service request. Upon identification of relevant ML models, API 350 may send the ML models to a quick access database 250 (e.g., a key-value pair database such as Casandra).

As illustrated in FIG. 3, database 250 may copy the selected ML models to an in-memory cache 230. The in-memory cache 230 may be a cluster of in-memory databases 331-233 (e.g., Redis database) to handle multiple predictive analysis requests simultaneously. The cluster of in-memory databases 331-233 may be storing different sets of ML models as per service requests provided by the adaptive service 310. In some embodiments, a single database in the cluster of in-memory databases 331-233 may store related or similar ML models.

Figure 4:
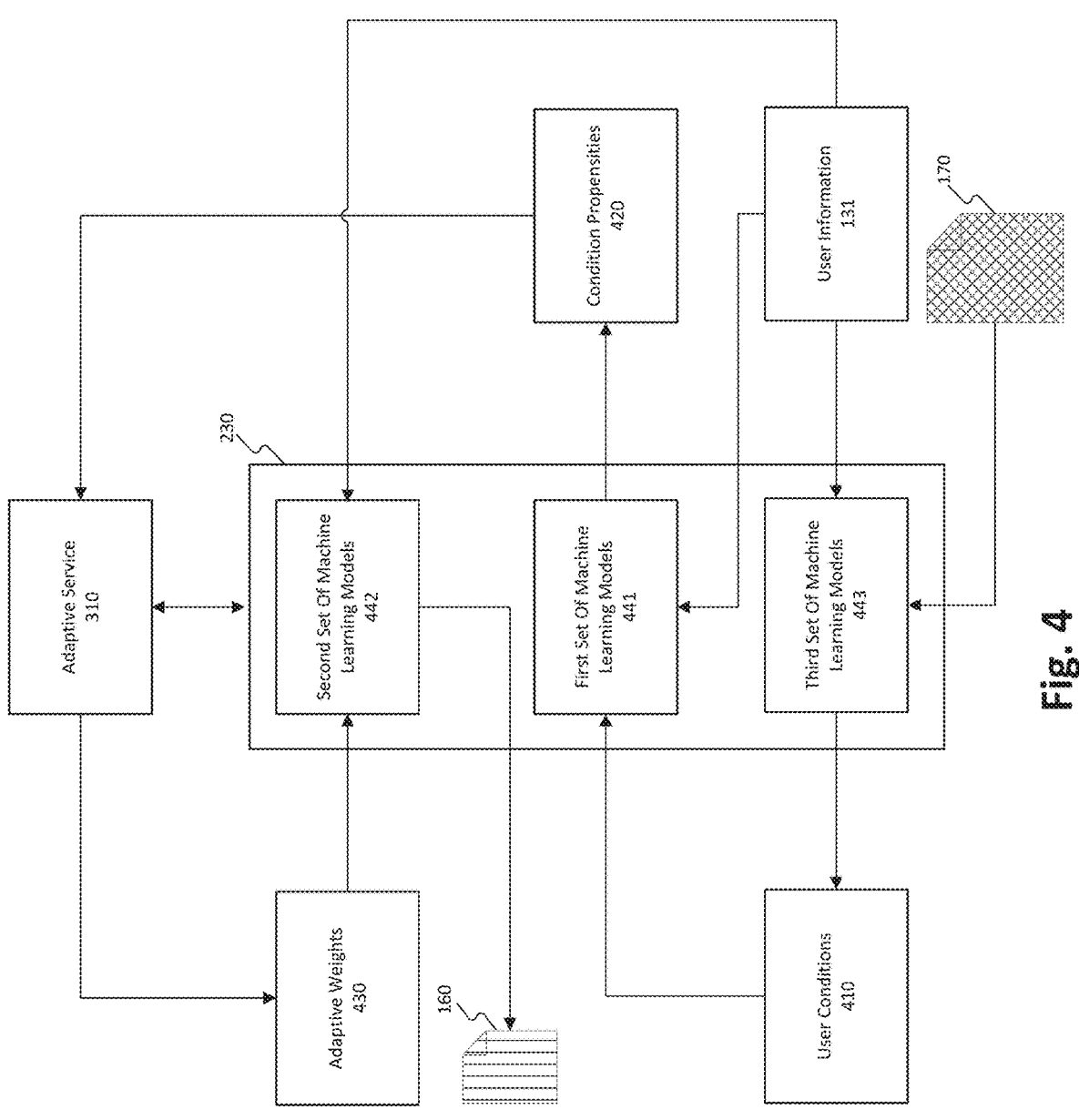
FIG. 4 illustrates an example of a first set of ML models' interaction with stored user data to determine adaptive weights to apply to a second set of ML models identifying service providers, according to some embodiments of the present disclosure.

FIG. 4 illustrates an example of a first set of ML models' interaction with stored user data to determine adaptive weights to apply to a second set of ML models identifying service providers, according to some embodiments of the present disclosure. The ML models stored in the in-memory cache 230 may comprise of at least three sets of ML models: a first set of ML models 441, a second set of ML models 442, and a third set of ML models 443. The three sets of ML models together may help with the generation of a personalized virtual network (e.g., the personalized virtual network 160). The first set of ML models 441 may work along with the third set of ML models 443 to help determine the weights that may be applied to the various models identified in the second set of ML models 442.

The first set of ML models 441 may represent a set of ML models used for understanding the requirements of a user (e.g., the user 190) sending a query (e.g., the query 150) to the adaptive weighting system 100. The first set of ML models 441 may present the requirements of the user by determining the importance to be given to different ML models identifying service providers based on different factors (e.g., specialization, services provided, demographic details, efficiency, quality, etc.,). The importance of the ML models identifying service providers may be identified by a weight factor to be applied to each of the ML models. The requirements of a user may be solutions the user may want or need based on the query (e.g., the query 150) sent by the user (e.g., the user 190). The first set of ML models 441 may include predictive models to predict future events based on the currently provided information (e.g., the query 150) and historical information (e.g., the user information 131). A prediction of an event may be represented by the probability of the occurrence of the future event. In order for the first set of ML models 441 to make such predictions, they may use features that indicate that the event might occur with a certain probability. Such features are descriptions of the conditions of the user (e.g., the user 190) making the query (e.g., the query 150) and are represented in FIG. 4 as user conditions 410. In some embodiments, features may already exist in feature bank 232. The probability of future events occurrences as determined by the first set of ML models 441 is represented in FIG. 4 as condition propensities 420.

A user condition can be a medical condition, a description of an ailment suffered in the past or currently by a user. For example, a user suffering from back pain as a medical condition can be a user condition that may indicate a higher probability of an event of a visit to an orthopedic surgeon in the future. The user condition can also be a clinical condition that includes many different conditions. It may also include the severity and state of the condition associated with a user. For example, a user's history of a visit to a chiropractor and a sports medicine doctor may together indicate a higher probability of a visit to an orthopedic surgeon in the future. In another example, the same user stoppage of visiting the chiropractor may indicate back pain of lower severity and lower probability of seeing an orthopedic surgeon in the future. The clinical condition can be a series of related conditions. In another embodiment, a user condition may also be the occurrence of an event. For example, the ML models may derive a user's back pain condition from both the healthcare records and a user's insurance claims.

The first set of ML models 441 may help determine the propensity of a certain condition of user conditions 410 in order to determine the adaptive weight to apply to a certain model in the second set of ML models 442. The condition propensities 420 generated by the first set of ML models 441 may each be applicable to a single model in the second set of ML models 442. In some embodiments, a single condition propensity in the condition propensities 420 may be associated with multiple models of the second set of ML models 442. Adaptive service 310 may help map the condition propensities 420 that may affect the second set of ML models 442 by generating adaptive weights 430.

The first set of ML models 441 may utilize the user conditions 410 as one of the inputs to determine propensity of each condition in relation to a user to whom the service request is associated. The first set of ML models 441 may utilize the user information 131 to determine the propensity of user conditions 410 predicted by third ML models 443, described below. The first set of ML models 441 may generate a condition propensity table (not shown in the figure) for each condition associated with the user. The condition propensities 420 may be used by the adaptive service 310 in determining the adaptive weights 430 to apply to the second set of ML models 442.

The second set of ML models 442 may represent a set of models used for matching user requirements identified by the first set of ML models 441 with a set of service providers. The matching of user requirements may occur based on the weight applied to each model in the second set of ML models 442. For example, a search query for foot pain by an individual who recently went through a knee surgery may result in higher weight applied to a physiotherapy service providers model and a lower weight to a podiatrists' model. In some embodiments, the weightage may be applied to the rank of a service provider generated by the online ranking service 210. The second set of ML models 442 with the help of adaptive weights 430 may identify the service providers to be included in the private network. The adaptive weights 430 upon application to the second set of ML models 442 may eliminate non-compatible models. The non-compatible models may include models for non-relevant service providers. For example, a search query for foot pain by an individual who recently went through a knee surgery may not consider models of orthopedic surgeons. The application of adaptive weights 430 may involve multiplying a model's prediction probability of a service provider by a certain numerical value. In some embodiments, the adaptive weights 430 may be applied to the inputs supplied to the second set of ML models 442.

The third set of ML models 443 may represent a set of models used for determining the current state of a user (e.g., the user 190) sending a query (e.g., the query 150) to the adaptive weighting system 100. The current state of the user is defined by the occurrence of specific events represented in FIG. 4 as user conditions 410. The third set of ML Models 443 may help identify a user's state based on past information (e.g., user information 131) about the user and the service request 170 generated by adaptive engine 110 clarifying the needs of the user 190. In some embodiments, the features in feature bank 232 (shown in FIG. 2) may be considered as descriptions of the events and used to determine user conditions 410. In some embodiments, the third set of ML models 443 may use features in the feature bank 232 to determine new features specific to the user (e.g., user 190) or the query (e.g., query 150) shared with the adaptive weighting system 100.

Figure 5:
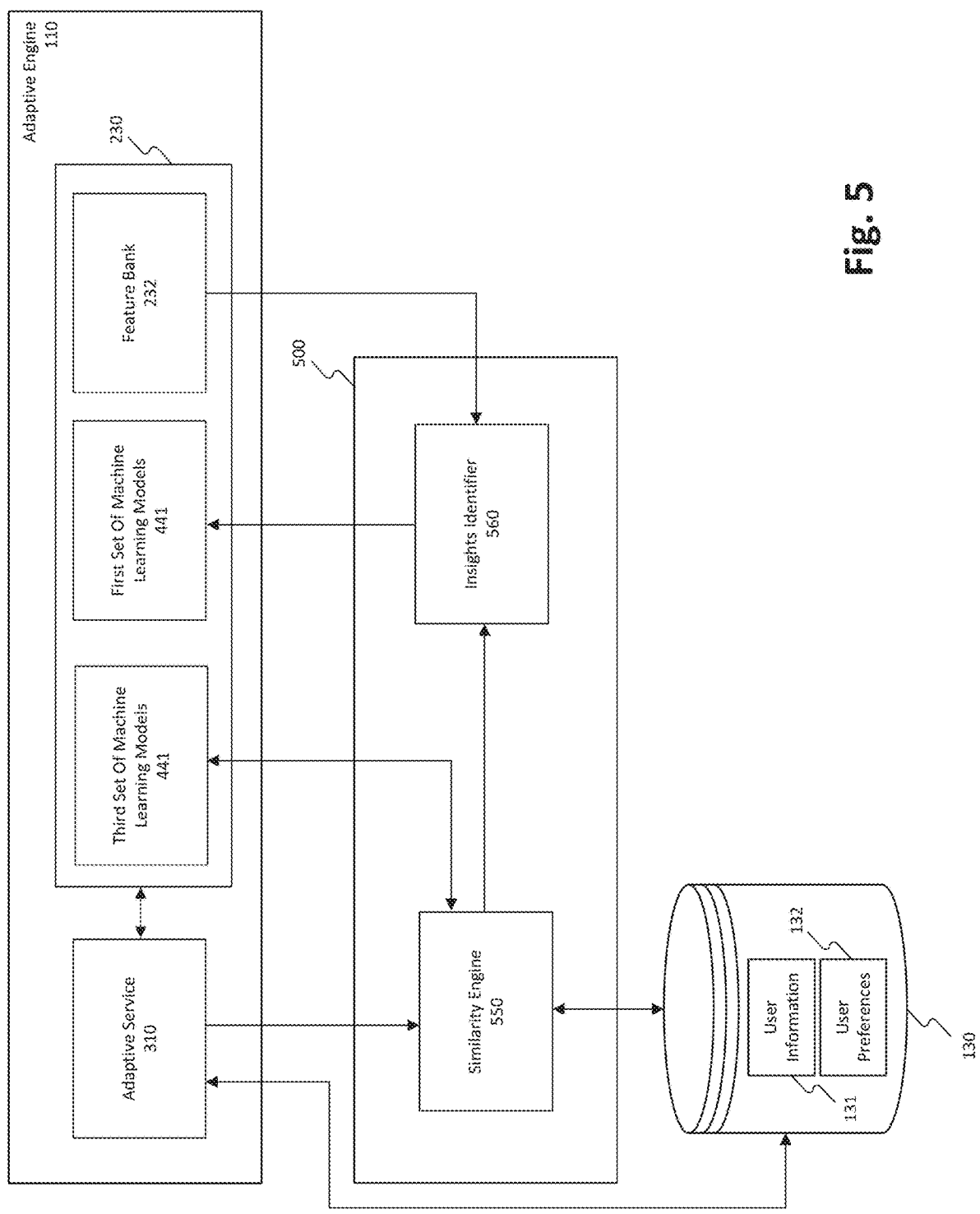
FIG. 5 illustrates an exemplary embodiment of the first set of machine learning models training process, according to some embodiments of the present disclosure.

FIG. 5 illustrates an exemplary embodiment of the first set of machine learning models training process, according to some embodiments of the present disclosure. Adaptive weighting system 100 may utilize the services of a training module 500 to train the first set of ML models 441. The training module 500 may comprise similarity engine 550 and insights identifier 560.

The similarity engine 550 may communicate with database 130 to identify other users similar to a user (e.g., the user 190) sending a query (e.g., the query 150) to the adaptive weighting system 100. The similarity engine 550 may compare the user's state (e.g., the user conditions 410) with the state of other users of the adaptive weighting system 100. The similarity engine 550 may determine the user's state by requesting the third set of ML models 443 to determine the user conditions 410 based on user information 131. In some embodiments, the other users' conditions may also be evaluated using stored information about other users in database 130. The similarity engine 550 may request the third set of ML models 443 to determine the state of the other users of the adaptive weighting system 100. In some embodiments, the similarity engine 550 may identify similar users based on the similarity of preferences of a set of other users and the user. The similarity engine 550 upon identification of similar users may supply the identifiers of similar users to an insights identifier 560.

The insights identifier 560 may identify any insights about the similar customers found by the similarity engine 550. An insight is a relationship between past and future events as related to a user. The relationship may be the probability of the occurrence of a future event. In some embodiments, the relationship may be a potential time frame or frequency of occurrence of a future event. For example, a user visiting a chiropractor for back pain may result in the past events of chiropractor visits linked to a future predicted visit to an orthopedic surgeon when the visits to chiropractor occur in a short interval of time. The insights identifier 560 may determine the relationship by evaluating if a previously identified feature describing certain events has occurred. For example, the feature may be cure of back injury event and its occurrence may be determined by the stoppage of visits to chiropractors or it could be diagnoses for a user. The insights identifier 560 may determine insights by accessing the feature bank 232 to determine relationships to future events. The relationships identified by the insights identifier 560 may be used as input to the first set of ML models 441. Such insights may be helpful in learning to understand how various conditions of related users are affected by a feature and thus adapt to any predicted new conditions supplied by third set of ML models 443 (as described in FIG. 4).

Figure 6:
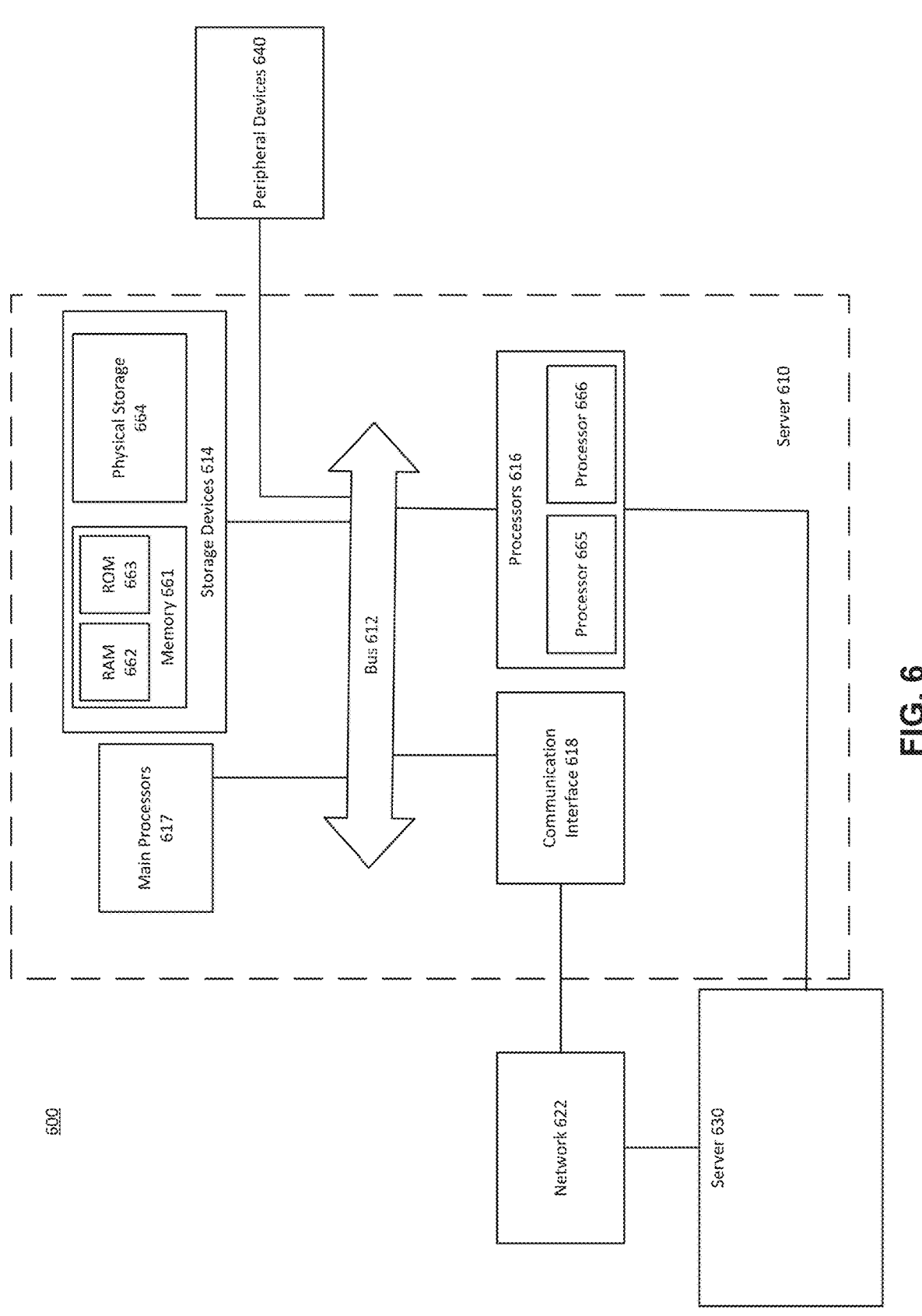
FIG. 6 illustrates a schematic diagram of an exemplary server of a distributed system, according to some embodiments of the present disclosure.

FIG. 6 illustrates a schematic diagram of an exemplary server of a distributed system, according to some embodiments of the present disclosure. According to FIG. 6, server 610 of distributed system 600 comprises a bus 612 or other communication mechanisms for communicating information, one or more processors 616 communicatively coupled with bus 612 for processing information, and one or more main processors 617 communicatively coupled with bus 612 for processing information. Processors 616 can be, for example, one or more microprocessors. In some embodiments, one or more processors 616 comprises processor 665 and processor 666, and processor 665 and processor 666 are connected via an inter-chip interconnect of an interconnect topology. Main processors 617 can be, for example, central processing units ("CPUs").

Server 610 can transmit data to or communicate with another server 630 through a network 622. Network 622 can be a local network, an internet service provider, internet, or any combination thereof. Communication interface 618 of server 610 is connected to network 622, which can enable communication with server 630. In addition, server 610 can be coupled via bus 612 to peripheral devices 640, which comprises displays (e.g., cathode ray tube (CRT), liquid crystal display (LCD), touch screen, etc.) and input devices (e.g., keyboard, mouse, soft keypad, etc.).

Server 610 can be implemented using customized hard-wired logic, one or more ASICs or FPGAs, firmware, or program logic that in combination with the server causes server 610 to be a special-purpose machine.

Server 610 further comprises storage devices 614, which may include memory 661 and physical storage 664 (e.g., hard drive, solid-state drive, etc.). Memory 661 may include random access memory (RAM) 662 and read only memory (ROM) 663. Storage devices 614 can be communicatively coupled with processors 616 and main processors 617 via bus 612. Storage devices 614 may include a main memory, which can be used for storing temporary variables or other intermediate information during execution of instructions to be executed by processors 616 and main processors 617. Such instructions, after being stored in non-transitory storage media accessible to processors 616 and main processors 617, render server 610 into a special-purpose machine that is customized to perform operations specified in the instructions. The term "non-transitory media" as used herein refers to any non-transitory media storing data or instructions that cause a machine to operate in a specific fashion. Such non-transitory media can comprise non-volatile media or volatile media. Non-transitory media include, for example, optical or magnetic disks, dynamic memory, a floppy disk, a flexible disk, hard disk, solid state drive, magnetic tape, or any other magnetic data storage medium, a CD-ROM, any other optical data storage medium, any physical medium with patterns of holes, a RAM, a PROM, and an EPROM, a FLASH-EPROM, NVRAM, flash memory, register, cache, any other memory chip or cartridge, and networked versions of the same.

Various forms of media can be involved in carrying one or more sequences of one or more instructions to processors 616 or main processors 617 for execution. For example, the instructions can initially be carried out on a magnetic disk or solid-state drive of a remote computer. The remote computer can load the instructions into its dynamic memory and send the instructions over a telephone line using a modem. A modem local to server 610 can receive the data on the telephone line and use an infra-red transmitter to convert the data to an infra-red signal. An infra-red detector can receive the data carried in the infra-red signal and appropriate circuitry can place the data on bus 612. Bus 612 carries the data to the main memory within storage devices 614, from which processors 616 or main processors 617 retrieves and executes the instructions.

The adaptive weighting system 100 one or more of its components may reside on either server 610 or 630 and may be executed by processors 616 or 617. In some embodiments, the components of the adaptive weighting system 100 may be spread across multiple servers 610 and 630. For example, the online ranking service instances 211-214 may be executed on multiple servers. Similarly, the in-memory database instances 331-333 may be maintained by multiple servers 610 and 630.

FIG. 7 is a flowchart showing an exemplary method for generating a personalized virtual network, according to some embodiments of the present disclosure. The steps of method 700 may be performed by the adaptive weighting system 100 for purposes of illustration. It will be appreciated that the illustrated method 700 can be altered to modify the order of steps and to include additional steps.

In step 710, the adaptive weighting system 100 may acquire a request for a service (e.g., the service request 170) associated with a user (e.g., the user 190) and user's preferences (e.g., the user preferences 132). Adaptive weighting system 100 may acquire the service request that was sent directly by the user 190 through device 123. In some embodiments, the adaptive weighting system 100 may generate the service request based on a query (e.g., query 150 as described in FIG. 1). Adaptive engine 110 of the adaptive weighting system 100 may generate a service request (e.g., the service request 170) based on the user information 131 stored in the database 130. The user information 131 may include the past information of the user 190 making the query (e.g., query 150) to the adaptive weighting system 100. The adaptive engine 110 may parse the query 150 to determine what subset of the user information 131 is utilized in the generation of the service request 170. The past information in the user information 131 may include past queries made by the user 190, past service requests generated by the adaptive engine 110, the user's interactions with the service provider results, and feedback of the utilization of the personalized virtual network by the user 190.

The service request 170 may also include preferences provided by the user 190 along with the query. The user preferences not provided along with the query may be retrieved from the user preferences 132 generated from past queries to the adaptive weighting system 100. The user preferences not provided by the user 190 may result in default values for the user 190 used in the preparation of the service request 170.

In an example scenario, the user 190 may post a query for back pain to the adaptive weighting system 100 through device 123. The user 190 provided query may include a preference for a male service provider to address the back pain. The user 190 may include a preference for a weekend visit that is stored in the user preferences 132 records in the database 130. The user 190 preferences are retrieved from the database 130

In step 715, the adaptive engine 110 of the adaptive weighting system 100 may query the database 130 to access past user conditions records stored in the database 130. In some embodiments, the user information 131 may be parsed to extract the conditions of the user 190 making the query 150 through device 123. In the example scenario, the user 190 in the past may have visited a chiropractor according to the health care records stored in the database 130. The user 190 may have also had a surgery prior to the chiropractor visit for a back injury according to insurance claim records stored in the database 130. Both healthcare records and insurance claim records may be present in the user information 131, and from these records, two past conditions of the back injury may be retrieved from the database 130.

In step 720, the adaptive weighting system 100 may execute a set of machine learning models with past conditions as input to predict other conditions. A predictive set of other conditions (e.g., the user conditions 410) may be identified using the third set of ML models 443. The third set of ML models 443 may take the past conditions identified in step 720 to predict the user conditions 410. The third set of ML models 443 may be trained in predicting the occurrence of user conditions based on similar conditions occurrence for similarly situated users. In the example scenario, the third set of ML models 443 may take as input these two past conditions of back injury listed in step 715 to predict a new condition, a disc slip condition due to the past back injuries. The predicted new condition may rely on similar back injuries lasting for long periods that have been diagnosed as disc slip conditions in similarly situated other users. The identified conditions may include past conditions (continued lumbar injury) and predicted new conditions (disc slip) related to back injury.

In step 725, the adaptive weighting system 100 may identify other users similar to the user (e.g., the user 190). The similar users may be identified on the basis of similarity in preferences (e.g., the user preferences 132) of other users and the user 190 sending a query (e.g., query 150) to the adaptive weighting system 100. The similarity engine 550 may aid in identifying other users similar to the user, as described in FIG. 5.

In the example scenario, the other users in the same zip code and nearby zip codes may be selected to identify similar users. The selected users preferences are compared to the user 190 preferences both supplied by the user 190 (e.g., male service provider), previously stored in the database 130 (e.g., weekend visit). The similarity engine 550 may compare additional preferences for the type of care (surface care instead of invasive care) not explicitly stated by the user 190 in the query or stored in the user preferences 132. The type of care preference is determined from other preferences and user information relating to the user 190 stored in the user information 131.

In step 730, the adaptive weighting system 100 may train a first set of ML models (e.g., the first set of ML models 441) using insights from similar users identified in step 725. The insights of similar users may be determined by the insights identifier 560. Insights identifier 560 may identify insights of each of the similar users using the feature bank 232. In some embodiments, the insights identifier 560 may identify new features based on insights of similar users and may request them to be stored in the features repository 240. In the example scenario, insight of other users with a preference for surface care similar to the user 190 visits to physiotherapists resulting in reduced visits over a period of time indicate a cure for back injury. This insight of reduced frequency of visits to the physiotherapists is used to train the first set of ML models 441 to help identify the propensity of conditions that would be affected by certain service providers and those which do not.

In step 735, the adaptive weighting system 100 may determine propensities of conditions identified in step 720 using the first set of ML models 441 with the conditions (e.g., the user conditions 410) as input. The propensity of a user condition may be predicted by the first set of ML models 441 based on past occurrences of similar conditions in similarly situated users identified by the similarity engine 550. In the example scenario, the trained first set of ML models 441 in step 730, when supplied with the identified conditions determined in step 720, results in higher propensities for surface care conditions that were addressed and lower propensities for invasive care conditions that were not addressed. Accordingly, the disc slip condition, which requires surgery, may have a lower propensity, while the continued lumbar injury may have a higher propensity.

In step 740, the adaptive weighting system 100 may identify a second set of ML models (e.g., the second set of ML models 442) based on the identified conditions (e.g., the user conditions 410) in step 720. The second set of ML models 442 identified from the ML models repository 140 may be utilized in predicting the service providers. The second set of ML models 442 may be filtered using the user conditions 410. The user conditions 410 may identify the important or relevant characteristics of a query (e.g., query 150) and accordingly assist with determining the relevant second set of ML models 442. For example, a user's query about a pregnancy pain may result in models related to gynecologists being selected as one of the models of the second set of ML models 442. The adaptive weighting system 100 may add additional user conditions of nutritional issues and identify a model related to nutritionists who also specialize in advising pregnant mothers. In the example scenario, the identified conditions (continued lumbar injury and disc slip) may result in the identification of care provider models for sports medicine doctors, physiotherapists, surgeons. The care provider models may include a generic surface care providers model, which includes all kinds of non-invasive care providers (occupational therapists, chiropractors).

In step 745, the adaptive weighting system 100 may determine compatible ML models in the second set of ML models 442 based on the user information 131, and the user preferences 132. The adaptive weighting system 100 may discard the non-compatible models or group them and execute them at a different time. For example, a user with pregnancy information in the stored user information 131 upon searching for abdomen pain may result in a model for urologists to be considered not compatible with a model for gynecologists. The model for urologists may be identified as relevant in step 740 but still may be considered not compatible with the other models in the second set of ML models 442. The same user, if not pregnant, could result in the adaptive weighting system 100 considering the models for gynecologists and urologists to be compatible. In some embodiments, the compatibility of models may be determined based on the user preferences 132 stored in database 130. For example, the same pregnant user may have a preference for a mid-wife for delivery stored in the user's preferences resulting in certain models related to gynecologists being considered incompatible and not included in the second set of ML models 442 for determining the personalized virtual network. In the example scenario, the sports medicine doctors model may be deemed not compatible based on user information 131, which does not include sports related injuries and thus regarded not compatible and is dropped from calculating an adaptive weight for the model.

In step 750, the adaptive weighting system 100 may evaluate weights (e.g., adaptive weights 430) for the compatible second set of ML models (e.g., the second set of ML models 442) based on the determined propensities (e.g., condition propensities 420) of one or more conditions (e.g., user conditions 410). In some embodiments, each condition in the user conditions 410 may have an associated unique model identified in the second set of ML models 442. When a condition in the user conditions 410 has a propensity value lower than a threshold, a model in the second set of ML models 442 may not be associated with the propensity value. The threshold for filtering models may vary between users of the adaptive weighting system 100 and may be set by the user (e.g., the user 190). In some embodiments, the threshold may be determined in real-time based on the query (e.g., query 150) or the user information 131 or the service request (e.g., the service request 170). The adaptive weights 430 may be set to zero in order to eliminate a certain model. In some embodiments, weights (e.g., adaptive weights 430) may only be included for the models to be considered in the generation of personalized virtual network (e.g., personalized virtual network 160). In the example scenario, the weights applied to compatible models may be proportional to the propensities of the related conditions based on which the models have been identified in step 740. Accordingly, the surface care providers model and physiotherapists model, which are identified based on the continued lumbar injury condition with a higher propensity will be given higher weight. The surgeons' model associated with the lower propensity disc slip condition is given a lower weight.

In step 755, the adaptive weighting system 100 may apply the evaluated weights (e.g., adaptive weights 430) to the second set of ML models (e.g., the second set of ML models 442) to generate a personalized virtual network for the user. Application of the evaluated weights may include multiplying the probability of the service provider inclusion in a personalized virtual network by a numerical value. In some embodiments, the weights may be applied to the ranks of the service providers identified by the second set of ML models 442 impacting the order of the service providers in a personalized virtual network. In the example scenario, the weights evaluated in step 750, when applied to the care provider models, results in more care providers identified by physiotherapists and surface care providers models like occupational therapists and chiropractors included more than the surgeons from surgeons model. This list of care providers is the personalized virtual network shared with the user 190, who sent a query for back pain in step 710.

As used herein, unless specifically stated otherwise, the term "or" encompasses all possible combinations, except where infeasible. For example, if it is stated that a component may include A or B, then, unless specifically stated otherwise or infeasible, the component may include A, or B, or A and B. As a second example, if it is stated that a component may include A, B, or C, then, unless specifically stated otherwise or infeasible, the component may include A, or B, or C, or A and B, or A and C, or B and C, or A and B and C.

Example embodiments are described above with reference to flowchart illustrations or block diagrams of methods, apparatus (systems) and computer program products. It will be understood that each block of the flowchart illustrations or block diagrams, and combinations of blocks in the flowchart illustrations or block diagrams, can be implemented by computer program product or instructions on a computer program product. These computer program instructions may be provided to a processor of a computer, or other programmable data processing apparatus to produce a machine, such that the instructions, which execute via the processor of the computer or other programmable data processing apparatus, create means for implementing the functions/acts specified in the flowchart or block diagram block or blocks.

These computer program instructions may also be stored in a computer readable medium that can direct one or more hardware processors of a computer, other programmable data processing apparatus, or other devices to function in a particular manner, such that the instructions stored in the computer readable medium form an article of manufacture including instructions that implement the function/act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions that execute on the computer or other programmable apparatus provide processes for implementing the functions/acts specified in the flowchart or block diagram block or blocks Any combination of one or more computer readable medium(s) may be utilized. The computer readable medium may be a non-transitory computer readable storage medium. In the context of this document, a computer readable storage medium may be any tangible medium that can contain or store a program for use by or in connection with an instruction execution system, apparatus, or device.

Program code embodied on a computer readable medium may be transmitted using any appropriate medium, including but not limited to wireless, wireline, optical fiber cable, RF, IR, etc., or any suitable combination of the foregoing.

Computer program code for carrying out operations for example embodiments may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate examples of the architecture, functionality, and operation of possible implementations of systems, methods, and computer program products according to various embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

It is understood that the described embodiments are not mutually exclusive, and elements, components, materials, or steps described in connection with one example embodiment may be combined with, or eliminated from, other embodiments in suitable ways to accomplish desired design objectives.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only. It is also intended that the sequence of steps shown in figures are only for illustrative purposes and are not intended to be limited to any particular sequence of steps. As such, those skilled in the art can appreciate that these steps can be performed in a different order while implementing the same method.

What is claimed is:

1. A non-transitory computer readable medium including instructions that are executable by one or more processors to cause a system to perform a method for generating a personalized virtual network, the method comprising:

acquiring a request for a service, wherein the request is associated with a user and the user's preferences;

identifying one or more conditions of the user based on stored user information corresponding to any past occurrences, of other users having features similar to the user, of a condition similar to the one or more conditions and the acquired request, wherein each condition of the identified one or more conditions is associated with a care provider model;

determining a propensity for each condition of the identified one or more conditions using a first set of one or more machine learning models with the stored user information as input;

identifying a second set of one or more machine learning models based on the identified one or more conditions, the second set of one or more models including the associated care provider model, wherein the determined propensity is compared against a corresponding threshold for filtering out models for the second set of one or more machine learning models;

evaluating weights for the second set of one or more machine learning models based on the determined propensities of one or more conditions; and applying the evaluated weights to the second set of models to generate a personalized virtual care provider network for the user, wherein the personalized virtual care provider network comprises an ordered listing of service providers ranked based on applying the features to the second set of models.

2. The non-transitory computer readable medium of claim 1, wherein identifying of one or more conditions of the user based on the stored user information and the acquired request comprises:

predicting the one or more conditions based on a third set of machine learning models using past conditions in the stored user information as input.

3. The non-transitory computer readable medium of claim 1, wherein the first set of one or more machine learning models are trained using insights from other users having features similar to the user and interacting with the personalized virtual care provider network.

4. The non-transitory computer readable medium of claim 3, wherein the other users similarity to the user is based on a type of the requested service and similarity of preferences of the other users and the user's preferences.

5. The non-transitory computer readable medium of claim 1, wherein identifying the second set of the one or more machine learning models comprises:

determining relevancy of each of the second set of one or models based on the stored user information and the user's preferences.

6. The non-transitory computer readable medium of claim 5, wherein determining the relevancy of each of the second set of one or more models comprises:

determining a compatibility of each model with the other models in the second set of one or more models.

7. The non-transitory computer readable medium of claim 5, wherein the second set of one or more machine learning models includes at least one of: service providers quality models, service providers expertise models, service providers location models.

8. The non-transitory computer readable medium of claim 1, wherein the second set of one or more machine learning models are associated with a stored set of service providers.

9. The non-transitory computer readable medium of claim 1, wherein generating a personalized virtual care provider network comprises:

evaluating order of the personalized virtual care provider network based on the user's stored information.

10. The non-transitory computer readable medium of claim 9, wherein the generating a personalized virtual care provider network of service provider further comprises:

generation of a subset of service providers for each of the identified one or more conditions.

11. A method performed by a system for generating a personalized virtual network, the method comprising:

acquiring a request for a service, wherein the request is associated with a user and the user's preferences;

identifying one or more conditions of the user based on stored user information corresponding to any past occurrences, of other users having features similar to the user, of a condition similar to the one or more conditions and the acquired request, wherein each condition of the identified one or more conditions is associated with a care provider model;

determining a propensity for each condition of the identified one or more conditions using a first set of one or more machine learning models with the stored user information as input;

identifying a second set of one or more machine learning models based on the identified one or more conditions, the second set of one or more models including the associated care provider model, wherein the determined propensity is compared against a corresponding threshold for filtering out models for the second set of one or more machine learning models;

evaluating weights for the second set of one or more machine learning models based on the determined propensities of one or more conditions; and applying the evaluated weights to the second set of models to generate a personalized virtual care provider network for the user, wherein the personalized virtual care provider network comprises an ordered listing of service providers ranked based on applying the features to the second set of models.

12. The method of claim 11, wherein identifying of one or more conditions of the user based on the stored user information and the acquired request comprises:

predicting the one or more conditions based on a third set of machine learning models using past conditions in the stored user information as input.

13. The method of claim 11, wherein the first set of one or more machine learning models are trained using insights from other users having features similar to the user and interacting with the personalized virtual care provider network.

14. The method of claim 13, wherein the other users similarity to the user is based on a type of the requested service and similarity of preferences of the other users and the user's preferences.

15. The method of claim 11, wherein the identifying the second set of the one or more machine learning models comprises:

determining relevancy of each of the second set of one or more models based on the stored user information and the user's preferences.

16. The method of claim 15, wherein determining the relevancy of each of the second set of one or more models comprises:

determining a compatibility of each model with the other models in the second set of one or more models.

17. The method of claim 15, wherein the second set of one or more machine learning models includes at least one of: service providers quality models, service providers expertise models, service providers location models.

18. The method of claim 11, wherein the second set of one or more machine learning models are associated with a stored set of service providers.

19. The method of claim 11, wherein generating a personalized virtual care provider network comprises:

evaluating order of the personalized virtual care provider network based on the user's stored information.

20. An adaptive weighting system comprising:

one or more memory devices storing processor-executable instructions; and one or more processors configured to execute the instructions to cause the adaptive weighting system to perform:

acquiring a request for a service, wherein the request is associated with a user and the user's preferences;

identifying one or more conditions of the user based on stored user information corresponding to any past occurrences, of other users having features similar to the user, of a condition similar to the one or more conditions and the acquired request, wherein each condition of the identified one or more conditions is associated with a care provider model;

determining a propensity for each condition of the identified one or more conditions using a first set of one or more machine learning models with the stored user information as input;

identifying a second set of one or more machine learning models based on the identified one or more conditions, the second set of one or more models including the associated care provider model, wherein the determined propensity is compared against a corresponding threshold for filtering out models for the second set of one or more machine learning models;

evaluating weights for the second set of one or more machine learning models based on the determined propensities of one or more conditions; and applying the evaluated weights to the second set of one or more models to generate a personalized virtual care provider network for the user, wherein the personalized virtual care provider network comprises an ordered listing of service providers ranked based on applying the features to the second set of models.

* * * * *